United States Patent [19]
Breck

[11] 3,723,308
[45] Mar. 27, 1973

[54] PROCESS FOR REMOVAL OF AMMONIA FROM WASTE WATER STREAMS

[76] Inventor: Donald W. Breck, 289 Hall Avenue, White Plains, N.Y. 10604

[22] Filed: Nov. 16, 1970

[21] Appl. No.: 89,782

[52] U.S. Cl. .................................................210/38
[51] Int. Cl. ...............................................C02b 1/44
[58] Field of Search ............................23/111–113; 210/31 R, 38

[56] References Cited

UNITED STATES PATENTS

| | | | |
|---|---|---|---|
| 3,010,789 | 11/1961 | Milton | 23/113 |
| 3,011,869 | 12/1961 | Breck et al. | 23/113 |
| 2,995,423 | 8/1961 | Breck et al. | 23/113 |
| 2,991,151 | 7/1961 | Breck et al. | 23/113 |
| 2,972,516 | 2/1961 | Barrer et al. | 23/113 |
| 3,033,641 | 5/1962 | Thomas | 210/38 X |

Primary Examiner—Reuben Friedman
Assistant Examiner—Thomas G. Wyse
Attorney—Wolfe, Hubbard, Leydig, Voit & Osann, Ltd.

[57] ABSTRACT

Ammonium ions are selectively removed from aqueous solutions containing alkali and/or alkaline earth cations by cation exchange with zeolite F. This is a synthetic crystalline aluminosilicate having a silica-to-alumina oxide mol ratio of about 2 which is derived from a potassium-rich reaction mixture. This zeolite possesses unusual cation exchange capacity and unpredictable selectivity for the ammonium ion.

1 Claim, 1 Drawing Figure

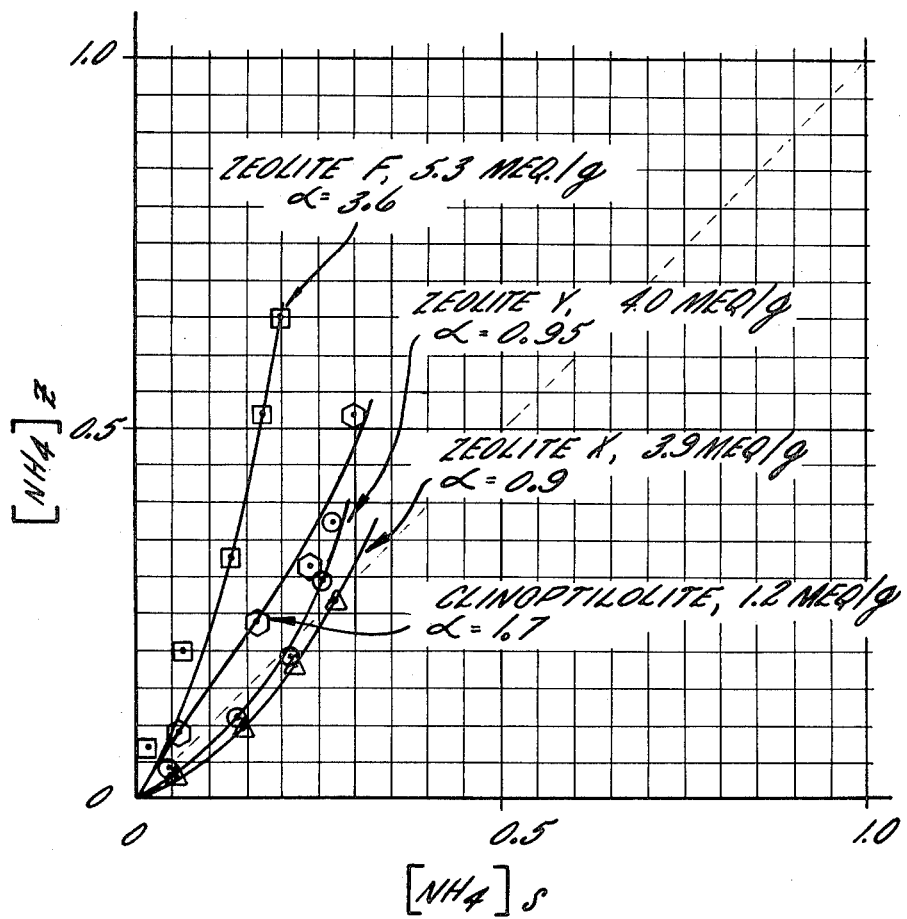

3,723,308

PROCESS FOR REMOVAL OF AMMONIA FROM WASTE WATER STREAMS

BACKGROUND OF THE INVENTION

This invention relates to the zeolitic cation exchange of ammonium ions from aqueous solutions containing at least one alkali or alkaline earth cation, and more particularly concerns the selective cation exchange of such solutions with a synthetic crystalline aluminosilicate. The invention is primarily concerned with the purification of waste waters containing ammonium cations in addition to other alkali or alkaline earth cations.

Ammonia, or the ammonium cation, has long been recognized as a serious pollutant in water. Its presence in municipal waste water and in the effluent from agricultural and industrial operations is as harmful as it is pervasive.

It has become apparent that the presence of ammonia in water has far more serious implications than merely serving as an index of recent pollution (see Mercer, B.M. et al., "Ammonia Removal from Agricultural Runoff and Secondary Effluents by Selective Ion Exchange," Pacific Northwest Laboratories (Battelle), December, 1968). Ammonia can be toxic to fish and aquatic life; while a maximum recommended ammonia concentration is 2.5 mg/l, as little as 0.3 to 0.4 mg/l is lethal to trout fry. Ammonia can contribute to explosive algae growths, ultimately causing eutrophic conditions in lakes. Ammonia can restrict waste water renovation and water reuse; since typical municipal waste water may contain 30 mg/l $NH_4$, the removal of 90–95 percent would be required for water reuse, but to achieve this by conventional electrodialysis "would be prohibitively costly" (Weinberger, L. W., et al., "Solving Our Water Problems--Water Renovation and Reuse," New York Academy of Science Meeting, Div. of Engineering, Dec. 8, 1965; quoted in Mercer et al, above). Ammonia can have detrimental effects on disinfection of water supplies; it reacts with chlorine to form chloramines which, while still bactericidal, are slower acting and less effective. Lastly, ammonia can be corrosive to certain metals and materials of construction; its effect on copper and zinc alloys is well known, and it can also be destructive to concrete made from portland cement.

Considerable attention, therefore, has been directed to the effective and economic removal of ammonia from waste water streams. Electrodialysis, as noted above, is prohibitive, and reverse osmosis has a similar disability.

Cation exchange for ammonia removal, using a variety of cation-active "zeolites", has been studied extensively but has resulted in only limited commercial utilization. The permutits (synthetic gel "zeolites" derived from sodium silicate and aluminum sulfate) and the hydrous gel-type amorphous minerals such as glauconite ("green sand") (Gleason, G. H. et al., Sewage Works Jour., Vol. 5, No. 1, pp. 61–73 (1933); Vol. 6, No. 3, pp. 450–468 (1934)) are effective but suffer from hydrolytic instability, have relatively low exchange capacity, often have other unsatisfactory regeneration characteristics, and may be difficult to form into useful shapes of acceptable physical properties. Organic "zeolites" (Nesselson, E. J., "Removal of Inorganic Nitrogen from Sewage Effluent." Ph.D. Thesis, Univ. of Wisconsin, (1954); Pollio, F. X. et al., Hydrocarbon Processing, pp. 124–126 (May, 1969)), which are sulfonated or carboxylated high polymers, are not selective for the ammonium ion, and instead prefer other cations such as calcium (Mercer, B. M. et al., cited above; Chem. Abstract, Vol. 71, No. 12, ref. 116322b.); in addition, their use entails excessive regenerant wastes (Ibid.).

Certain of the natural and synthetic crystalline aluminosilicates, which are true zeolites, have been studied for use in the selective cation exchange removal of ammonia. Fundamentally, the problem of selecting a zeolite is to obtain one having both adequate cation exchange capacity and adequate selectivity for the ammonium cation in the presence of alkali and alkaline earth metal cations, which inevitably are present in waste water streams. The crystalline aluminosilicates clinoptilolite, chabazite, erionite, and mordenite possess desirable selectivity characteristics, but relatively low cation exchange capacity in terms of equivalents per unit weight (Mercer, and data below). Conversely, many of the more commonly available crystalline aluminosilicates, such as zeolites A (U.S. Pat. No. 2,882,243), X (U.S. Pat. No. 2,882,244), and Y (U.S. Pat. No. 3,130,007) display satisfactory capacity, but their selectivity or preference for the ammonium cation is less than that of the mineral zeolites.

It is, accordingly, an object of the invention to provide a method for the zeolitic cation exchange removal of ammonium ions from an aqueous solution utilizing a zeolite possessing both high cation exchange capacity and excellent selectivity for the ammonium ion in the presence of one or more alkali or alkaline earth metal cations; and which zeolite has the necessary advantageous characteristics of rapid rate of exchange, ease and completeness of regeneration, stability to both the exchange solution and regenerant solutions, capability of functioning over a comparatively broad range of acidities and alkalinities, long service life, and relatively low economic cost.

SUMMARY OF THE INVENTION

Briefly, in accordance with the invention, ammonium ions are removed from aqueous solutions containing one or more alkali or alkaline earth cations by effecting the removal with Zeolite F a synthetic crystalline aluminosilicate having a silica to alumina oxide mol ratio of about 2 (plus or minus 0.3), and having been derived from a potassium-rich reaction mixture. This zeolite possesses unusually attractive cation exchange capacity and exceptional selectivity for the ammonium cation in the presence of interfering alkali and alkaline earth metal ions.

BRIEF DESCRIPTION OF THE DRAWING

Other advantages and objects of the invention will become apparent upon reading the following detailed description and upon reference to the single drawing, which compares the selectivities for a series of zeolites with respect to their ability to remove the ammonium ion from an aqueous solution containing ammonium, sodium, potassium, and calcium chlorides, at room temperature and at a total normality of between 0.15 and 0.18.

DETAILED DESCRIPTION OF THE INVENTION

As noted above, the zeolite F with which the present invention is concerned exhibits an unusual combination of cation exchange capacity and selectivity for the ammonium ion in the presence of other alkali and alkaline earth cations. As shown in Table A, below, the cation exchange capacity of zeolite F is substantially higher, per unit weight, than that of other common zeolites:

TABLE A

Cation Exchange Capacity of Zeolites

| Zeolite | Formula, Actual | Capacity |
|---|---|---|
| F | $0.10\ Na_2O \cdot 0.85\ K_2O \cdot 1.0\ Al_2O_3 \cdot 2.06\ SiO_2 \cdot 2.85\ H_2O$ | 5.3 meq/gm |
| Clinoptilolite | $0.69\ Na_2O \cdot 0.096\ CaO \cdot 0.216\ MgO \cdot 0.056\ K_2O \cdot 1.0\ Al_2O_3 \cdot 9.75\ SiO_2 \cdot 6.5\ H_2O$ | 1.2[1] |
| Linde AW 500 Chabazite-type (25% inert) | | 1.67[2] |
| Linde AW 400 (Erionite-type) (25% inert) | | 1.88[2] |
| Mordenite (Zeolon) | | 2.02[2] |
| Potassium X | $0.9\ K_2O \cdot 0.1\ Na_2O \cdot 1.0\ Al_2O_3 \cdot 2.56\ SiO_2 \cdot 5.6\ H_2O$ | 4.0 |
| Y | $1.00\ Na_2O \cdot 1.0\ Al_2O_3 \cdot 3.55\ SiO_2 \cdot 7.0\ H_2O$ | 4.0 |
| K, Pellets (20% Binder) | | 3.9 |

(1) Literature value (Mercer et al.) for $SiO_2/Al_2O_3 = 8-10$, 5-20% inert, is 1.81
(2) Literature values (Mercer et al.)

In combination with their attractive total cation capacity, zeolite F has an unexpected selectivity or preference for the ammonium ion in a solution containing ammonium and alkali or alkaline earth cations. This is demonstrated in Table B, below, which summarizes more complete data in Example IV, below, and which is partially depicted in the annexed drawing.

TABLE B

Selectivity of Zeolites for $NH_4$

| Zeolite | Equivalent Fraction, $NH_4$ on Zeolite, 0.4 | $NH_4$ loading, meq/g. |
|---|---|---|
| F | 3.5 | 2.1 |
| Clinoptilolite | 1.8 | .48 |
| Potassium X | 1.8 | 1.6 |
| Y | 1.8 | 1.6 |
| X, 20% Binder | 1.2 | 1.5 |

Particularly noteworthy is the fact that, alone among the zeolites, those potassium-derived zeolites included within the present invention, particularly zeolite F, have the unique combination of high cation exchange capacity per unit weight, and selectivity for the ammonium ion in the presence of alkali and alkaline earth cations.

Zeolite F is prepared, according to known techniques, from reaction mixtures which comprise water, a source of reactive silica, a source or reactive alumina, and an alkali which affords the necessary potassium oxide moiety. Potassium may be either the sole alkali, or it may be used in conjunction with one or more other alkaline materials such as sodium hydroxide, it being necessary, however, that when two or more alkalis are used that the structural framework of the resulting crystalline aluminosilicate be determined by the potassium ion. Thus, it is necessary that the reaction mixture be potassium-rich, although not necessarily that potassium be the predominant basic material present.

Zeolite F has a silica-to-alumina oxide mol ratio of about 2, that is, plus or minus 0.3. Potassium-derived zeolites having substantially lower ratios lack adequate stability and are otherwise undesirable, while potassium-derived aluminosilicates having substantially higher silica-to-alumina ratios have progressively less cation exchange capacity.

Potassium-derived zeolites include the zeolites F, H, J, M, Q, and Z, which are more fully identified in Table I, below. The respective zeolites, although of generally similar $K_2O$, alumina, and silica contents, do not necessarily have the same zeolitic water content and have quite dissimilar unit cell parameters. Their unit cell structures and dimensions are different from each other, and indeed some are in different crystallographic systems. X-ray diffraction is, of course, employed to differentiate among the crystalline aluminosilicates on the basis of their framework structures.

Zeolite F may be employed either in the potassium form in which it is synthesized or in any other exchangeable cation form. Thus, hydrogen, sodium, and other monovalent or divalent cation exchanged forms of the zeolite may be used.

TABLE I
Potassium derived zeolites

| Zeolite | Oxide mol ratios | | | | Unit cell contents, typical | Crystal data | Patent references |
|---|---|---|---|---|---|---|---|
| | $K_2O$ | $Al_2O_3$ | $SiO_2$ | $H_2O$ | | | |
| F | $0.95\pm0.15$ | 1 | $2.05\pm0.3$ | 0-3 | $K_{11}[(Al_2O_3)_{11}(SiO_2)_{11}]\cdot 16H_2O$ | Tetragonal, a=10.4, c=13.9 | U.S. 2,996,358. |
| H | $1.0\pm0.1$ | 1 | $2.0\pm0.1$ | 0-4 | $K_{8.4}[(Al_2O_3)_{8.4}(SiO_2)_{8.4}]\cdot 18H_2O$ | Hexagonal, a=13.4, c=13.2 | U.S. 3,010,789. |
| J | $0.9\pm0.1$ | 1 | $2.1\pm0.2$ | 0-1.4 | $K_7[(Al_2O_3)_7(SiO_2)_7]\cdot 4H_2O$ | Tetragonal, a=9.56, c=9.92 | U.S. 3,011,869. |
| M | $1.0\pm0.1$ | 1 | $2.0\pm0.1$ | 0-2 | $K_{14}[(Al_2O_3)_{11}(SiO_2)_{11}]\cdot 12H_2O$ | Tetragonal, a=13.1, c=10.5 | U.S. 2,995,423. |
| Q | $0.95\pm0.05$ | 1 | $2.2\pm0.05$ | 0-5 | $K_{40}[(Al_2O_3)_{40}(SiO_2)_{44}]\cdot 86H_2O$ | Tetragonal, a=13.5, c=35.2 | U.S. 2,991,151. |
| Z | 1 | 1 | 2 | 0-3 | Not determined | Not determined | U.S. 2,972,516. |

There appears to be no satisfactory explanation for the selectivity of potassium-derived low silica-to-alumina ratio zeolites for the ammonium ion as compared to competing alkali or alkaline earth cations.

In addition to their unique combination of exchange capacity and ammonium ion selectivity, zeolite F is readily regenerated, typically by washing with a regenerant solution containing, in high concentration, an ion which the ammonium cation is capable of replacing when the two cations are present in generally similar concentrations. Thus, treatment with a saturated calcium hydroxide solution is effective in removing exchanged ammonium ion, even though the zeolite is capable of selectively imbibing the ammonium ion from a solution containing approximately equal amounts of ammonium and calcium ions.

In addition to the above features, zeolite F has an advantageous cation exchange rate, and is stable to both the liquid undergoing regeneration and the regenerant solutions. Further, it is durable and rugged, and capable of operating at a comparatively wide range of temperatures and pH's.

DETERMINATION OF SEPARATION FACTOR

Ion exchange being an equilibrium phenomenon, the selectivity of a zeolite for one ion in preference to another may be expressed in terms of a separation factor, $\alpha_B^A$. This factor $\alpha_B^A$ is defined by the equation:

$$\alpha_B^A = (A_z \cdot B_s / A_s \cdot B_z)$$

for the ion exchange reaction, at equilibrium, of the system:

$$A_s + B_z = A_z + B_s$$

In the above equation:

$A_s$ Is equivalent fraction of exchanging ion A in solution,
$B_z$ is equivalent fraction of ion B in the zeolite,
$A_z$ is equivalent fraction of ion A in the zeolite,
$B_s$ is equivalent fraction of ion B in solution.

Otherwise expressed, and with reference to the system where one is interested in the selectivity of a zeolite for the ammonium cation in solution together with other cations, the first equation above may be expressed as:

Selectivity of zeolite for $NH_4$ compared to other cations
= (equivalent fraction of $NH_4$ in zeolite)/(equivalent fraction of $NH_4$ in solution) X (equivalent fraction of other cations in solution)/(equivalent fraction of other cations in zeolite)

In the above equations, the separation factor $\alpha_B^A$ is a function of the ions, the zeolite, and the solution composition. Thus, $\alpha_B^A$ implicity refers to a specified temperature (isotherm), total ionic concentration, ionic composition, and degree of exchange ($A_z$). Experimentally, selectivity is influenced by such additional factors as the size of the solvated ions, valence, "ion-sieve" action, formation of complexes or precipitates, and temperature, but the possible interaction of these factors in a given ion exchange process renders it difficult to predict the selectivity of a particular zeolite in a given system.

In view of the dependency of the separation factor $\alpha_B^A$ on ionic concentration and degree of exchange, it is customary to express selectivity in the form of an isotherm chart, as typified by the annexed drawing. Referring to the drawing, the abscissa is the equivalent fraction of the ammonium cation in solution, $[NH_4]_s$, while the ordinate is the equivalent fraction of $NH_4$ in the zeolite, $[NH_4]_z$. A dashed line from the origin to the opposite corner, with a slope of unity, represents a separation factor $\alpha_B^{NH_4}$ of 1.0; that is, the relationship between ordinate and abscissa if the zeolite had no preference for the ammonium ion over any other ion in the system. Above this line is a family of curves representing the selectivity of the indicated zeolites for the ammonium ion in the system studied, namely sodium chloride concentration of 85 meg/l, KCl concentration of 50 meq/l, and calcium chloride concentration of 5 meq/l, with a total normality of 0.15 to 0.18 and at room temperature.

EXAMPLES AND ILLUSTRATIVE EMBODIMENT

The invention will be more fully explained and exemplified in the following Examples and illustrative embodiment.

EXAMPLE I

This Example illustrates the comparative effectiveness of several natural and synthetic zeolites for removing ammonium ions from an aqueous solution containing alkali and alkaline earth metal cations.

The zeolites are potassium zeolite F (a potassium-derived synthetic crystalline aluminosilicate having a silica to alumina oxide mol ratio of about 2), sodium zeolite X (a sodium-derived synthetic crystalline aluminosilicate having a silica to alumina oxide mol ratio of about 2.5), two samples of natural clinoptilolite, and one of a synthetic organic cation exchange resin, namely a sulfonated synthetic polystyrene resin (Amberlite IRC-84, in the acid state). Analyses of the inorganic materials are reported in Table II, below, together with the analyses of other synthetic crystalline aluminosilicates used in subsequent Examples. (In Table II, the potassium zeolites X and Y are synthesized in the sodium form and thereafter stirred with 30 percent potassium chloride solutions to effect cation exchange to the potassium forms).

TABLE II

Chemical analysis of zeolites

| Zeolite | Composition, weight percent | | | | | | |
|---|---|---|---|---|---|---|---|
| | Na₂O | Al₂O₃ | SiO₂ | LOI* | CaO | MgO | K₂O |
| Potassium zeolite F powder | 0.17 | 28.1 | 34.0 | 14.1 | | | 22.1 |
| Sodium zeolite X ¹ 1/16" pellets, 25% binder | 12.1 | 22.0 | 38.8 | 23.2 | | | |
| Clinoptilolite "A," Hector, Calif., powder | 4.9 | 11.7 | 66.9 | 13.5 | 0.6 | 1.0 | 0.6 |
| Clinoptilolite "B" (low purity), Hector, Calif., powder | 1.4 | 13.2 | 61.9 | 15.7 | 2.4 | 1.5 | 1.8 |
| Chabazite 1/16" pellets | 3.0 | 13.5 | 57.1 | 15.5 | 3.2 | 1.3 | 1.4 |
| Sodium zeolite A ² 1/16" pellets, binderless | 15.1 | 28.0 | 35.8 | 20.1 | | | |
| Sodium zeolite Y ³ powder | 12.6 | 20.4 | 41.7 | 25.0 | | | |
| Potassium zeolite X ¹ powder | 0.21 | 23.0 | 34.5 | 22.8 | | | 18.9 |
| Potassium zeolite Y ³ powder | 0.15 | 19.8 | 40.4 | 21.3 | | | 17.4 |

¹ U.S. 2,882,244.  ² U.S. 2,882,243.  ³ U.S. 3,130,007.
*Loss on ignition, i.e., zeolitic water.

A synthetic solution, representing a typical municipal waste-water secondary effluent from a waste treatment plant, is then prepared. Its analysis is presented in Table III, below.

TABLE III

Waste Water Analysis

| Component | ppm |
|---|---|
| Ammonium, as nitrogen | 14 |
| Sodium | 58 |
| Potassium | 12 |
| Magnesium | 8 |
| Calcium | 34 |
| Alkalinity, as $CaCO_3$ | 180 |
| Orthophosphate, as phosphate | 9 |
| Sulfate, as sulfur | 20 |
| pH | 7.45 |

Portions of the solution are contacted with potassium zeolite F, sodium zeolite X, two clinoptilolite samples, and the Amberlite resin. Each experiment is duplicated, using a different quantity of zeolite each time.

The results from treating 100 ml of the synthetic effluent solution with the indicated weights of zeolite are presented below in Table IV. While all three of the crystalline aluminosilicates, namely potassium zeolite F, clinoptilolite, and sodium zeolite X, are capable of removing ammonia, or the ammonium cation, to a level of about 2 ppm in the presence of extraneous alkali and alkaline earth cations, potassium zeolite F exhibits a substantially higher capacity in terms of quantity of ammonia per unit weight of zeolite. The inability of organic cation exchange resins to selectively remove ammonium ions in a waste-water effluent is manifest.

TABLE IV

Effectiveness of Potassium-Derived, Sodium-Derived, Mineral and Organic Zeolites For Selective Removal of Ammonium Ions in the Presence of Na, K, Mg, and Ca

| Zeolite | Weight of zeolite, grams | N in treated effluent, ppm | N taken Up By Zeolite after exchange mg. | N taken up per Unit weight of Zeolite mg/gram |
|---|---|---|---|---|
| None | | 14 | | |
| Potassium F, powder | 0.3 | 2.3 | 1.16 | 3.9 |
| | 0.5 | 2.0 | 1.23 | 2.5 |
| Sodium zeolite X, 1/16 inch pellets, 25% binder | 1.0 | 1.7 | 1.15 | 1.2 |
| | 1.6 | 1.6 | 1.15 | 0.72 |
| Clinoptilolite "A" Hector, Calif., powder | 0.7 | 1.4 | 1.30 | 1.9 |
| | 1.1 | 1.0 | 1.30 | 1.2 |
| Clinoptilolite "B" (low purity) Hector, Calif., powder | 2.0 | 1.8 | 1.18 | 0.59 |
| | 4.0 | 3.3 | 1.01 | 0.25 |
| Amberlite resin IRC-84 | 1.0 | 12 | 0.26 | 0.26 |
| | 1.6 | 12 | 0.32 | 0.20 |

NOTE: Initial quantity of nitrogen in effluent 1.40 mg (100 ml, 14 mg/l)

EXAMPLE II

This Example further demonstrates the unusually high selectivity and capacity of zeolite F for the ammonium ion, as compared with a series of natural mineral zeolites and sodium-derived synthetic crystalline aluminosilicates (zeolite A, zeolite X, and zeolite Y).

For this series of experiments, 10.0 grams of a zeolite is equilibrated for one hour in a stirred 500 ml solution containing 85 meq/liter sodium, 50 meq/l potassium, 5 meq/l calcium, and about 60 meq/l ammonium (all as the chlorides).

The results are presented in Table V, below. The superiority of zeolite F is again demonstrated.

TABLE V

Effectiveness of Various Zeolites for Selective Removal of Ammonium Ions in the Presence of Na, K, Mg, and Ca—Batch Tests

| Zeolite | $NH_4$ Takeup meq/gm |
|---|---|
| Potassium zeolite F | 2.47 |
| Potassium zeolite F | 2.35 |
| Sodium zeolite X[1] | 0.65 |
| Clinoptilolite A | 0.49 |
| Clinoptilolite B | 0.24 |
| Chabazite[1] | 0.80[3] |
| Sodium zeolite A[2] | 0.70[3] |
| Sodium zeolite Y | 0.96 |
| Potassium zeolite X | 0.84 |
| Potassium zeolite Y | 0.95 |

(1) 1/16 inch pellets, 25% binder
(2) 1/16 inch pellets, binderless
(3) Calculated; by difference

EXAMPLE III

This Example demonstrates the ease of regenerating an ammonium-form zeolite F with a solution of sodium chloride, potassium chloride, and calcium chloride.

The two potassium zeolite F samples employed in Example II, after ammonium exchange, are separately back-exchanged, or regenerated, by stirring with a regenerant solution. 500 ml of the solution, containing 140 meq NaCl per liter, 15 meq/l KCl, and 5 meq/l $CaCl_2$ is stirred with each 10 gram sample of exchanged zeolite F for thirty minutes at room temperature. After the back-exchange, the powdered zeolite is centrifuged from the solution, washed with water, dried at 110° C, air-equilibrated, and analyzed for ammonium ion.

Ammonium determinations are performed by treating 10 ml aliquots of solution, or 200 milligrams of zeolite, in a Kjeldahl distillation unit with 50 percent potassium hydroxide solution, steam distilling the ammonia into 10 ml of saturated boric acid solution, and titrating the 100 ml of steam distillate containing the ammonia with 0.025 N hydrochloric acid to the methyl purple endpoint.

At the end of 0.5 hours of regeneration, the ammonium-exchanged zeolite F sample of Example II that contained 2.47 meq $NH_4$/gram has 0.81 meq $NH_4$/gram removed by back-exchange. The ammonium-exchanged zeolite F of Example II that originally contained 2.35 meq $NH_4$/gram has 0.69 meq $NH_4$/gram removed.

EXAMPLE IV

This Example illustrates the experimental determination of cation exchange separation factors in a zeolitic cation exchange system.

The zeolites are potassium zeolite F, the mineral clinoptilolite, and the sodium-derived zeolites X and Y. A predetermined quantity of powder-formed zeolite is stirred, at room temperature, with 500 ml of a solution containing 85 meq/l sodium chloride, 50 meq/l potassium chloride, and 5 meq/l calcium chloride, with varying amounts of ammonium chloride added to the solution to afford the ammonium cation.

After each increment of ammonium chloride is added, the solution is equilibrated for approximately one-half hour, after which an aliquot of each solution is withdrawn for analysis, replaced by an equal amount of original solution, and an additional increment of ammonium chloride added to raise the ammonium ion concentration.

A series of such incremental ammonium additions, equilibrations, and analyses is performed with each zeolite to obtain equilibria at a series of ammonium chloride concentrations.

From the above data, the varied terms of the separation factor equation are computed. Tables VI through IX, below, summarize the experimental data for potassium zeolite F, clinoptilolite, potassium zeolite X, and sodium zeolite Y, respectively. Cation exchange capacity is computed directly from the molar analysis of the zeolite.

Results of the various experiments are expressed in the Figure accompanying this specification, and are summarized, at two selected degrees of ammonium exchange ($A_z$) in Table B, presented earlier.

TABLE VI

Selectivity—Zeolite F (10.0059 gm zeolite, 500 ml solution containing 85 meq NaCl, 50 meq KCl, and 5 meq $CaCl_2$ per liter; room temperature)

Equilibrium

| Run No. | 1 | 2 | 3 | 4 | 5 |
|---|---|---|---|---|---|
| Total meq all cations in solution | 75 | 82 | 96 | 116 | 134 |
| $(NH_4)_s$, meq $NH_4$ in solution | 1.2 | 5.4 | 12.8 | 20.6 | 26.7 |
| $(B)_s$, meq other cations in solution | 73.8 | 76.6 | 92.5 | 95 | 107. |
| $(NH_4)_z$, meq $NH_4$ per g zeolite | 0.38 | 1.06 | 1.73 | 2.76 | 3.45 |
| $(B)_z$, meq other cations per g zeolite | 4.92 | 3.24 | 3.57 | 2.54 | 1.45 |
| $[NH_4]_z$, equivalent fraction $NH_4$ in zeolite | 0.07 | 0.20 | 0.33 | 0.52 | 0.65 |
| $[NH_4]_s$, equivalent fraction $NH_4$ in solution | 0.017 | 0.066 | 0.13 | 0.18 | 0.20 |

Analysis, moles: $0.1\ Na_2O \cdot 0.85\ K_2O \cdot 1.0\ Al_2O_3 \cdot 2.06\ SiO_2 \cdot 2.85\ H_2O$
Calculated cation exchange capacity, meq/gram, 5.3

TABLE VII

Selectivity—Clinoptilolite (Hector)

(7.65 gm zeolite, 500 ml solution containing 85 meq NaCl, 50 meq KCl, and 5 meq $CaCl_2$ per liter; room temperature)

Equilibrium

| Run No. | 1 | 2 | 3 | 4 |
|---|---|---|---|---|
| Total meq all cations in solution | 75 | 85 | 95 | 105 |
| $(NH_4)_s$, meq $NH_4$ in solution | 4.2 | 13.2 | 22.9 | 33.0 |
| $(B)_s$, meq other cations in solution | 71 | 72 | 72 | 72 |
| $(NH_4)_z$, meq $NH_4$ per g zeolite | .105 | .288 | .379 | .627 |
| $(B)_z$, meq other cations per g zeolite | 1.1 | 0.91 | 0.82 | 0.57 |
| $[NH_4]_z$, equivalent fraction $NH_4$ in zeolite | 0.088 | 0.24 | 0.316 | 0.52 |
| $[NH_4]_s$, equivalent fraction $NH_4$ in solution | 0.056 | 0.155 | 0.24 | 0.30 |

Analysis, moles: $0.69\ Na_2O \cdot 0.096\ CaO \cdot 0.216\ MgO \cdot 0.056\ K_2O \cdot 1.0\ Al_2O_3 \cdot 9.75\ SiO_2 \cdot 6.5\ H_2O$
Calculated cation exchange capacity, meq/gram, 1.2

TABLE VIII

Selectivity, Zeolite X (10 g. of zeolite pellets 1/16 inch in 500 ml. solution containing 85 meq NaCl, 50 meq KCl, and 5 meq $CaCl_2$ per liter for 2 hrs.)

| RUN NO. | 1 | 2 | 3 | 4 |
|---|---|---|---|---|
| Total meq cations in solution | 75 | 81 | 95 | 112 |
| $(NH_4)_s$, meq $NH_4$ in solution | 3.7 | 11.5 | 20.1 | 29.7 |
| $B_s$, meq other cations in solution | 71.3 | 69.5 | 74.9 | 82.3 |
| $(NH_4)_z$, meq $NH_4$ per g zeolite | 0.145 | 0.39 | 0.72 | 1.06 |
| $B_z$, meq other cations per g zeolite | 3.76 | 3.51 | 3.18 | 2.84 |
| $[NH_4]_z$, equivalent fraction $NH_4$ in zeolite | 0.036 | 0.10 | 0.19 | 0.27 |
| $[NH_4]_s$, equivalent fraction $NH_4$ in solution | 0.05 | 0.142 | 0.21 | 0.27 |

Analysis, moles: $0.9\ K_2O \cdot 0.1\ Na_2O \cdot 1.0\ Al_2O_3 \cdot 2.56\ SiO_2 \cdot 5.6\ H_2O$
Calculated cation exchange capacity, meq/gram, 3.9 for zeolite pellets containing 20% by weight (dry basis) of inert clay binder and 23.2% by weight $H_2O$ as used.

TABLE IX

Selectivity—Zeolite Y (10.0290 gm zeolite, 500 ml solution containing 85 meq NaCl, 50 meq KCl, and 5 meq CaCl per liter; room temperature)

Equilibrium

| Run No. | 1 | 2 | 3 | 4 | 5 |
|---|---|---|---|---|---|
| Total meq all cations in solution | 75 | 81 | 95 | 113 | 128 |
| $(NH_4)_s$, meq $NH_4$ in solution | 3.4 | 11.4 | 19.9 | 29.4 | 35.2 |
| $(B)_s$, meq other cations in solutions | 72 | 70 | 75 | 83.4 | 92.6 |
| $(NH_4)_z$, meq $NH_4$ per g zeolite | 0.17 | 0.44 | 0.75 | 0.18 | 1.49 |
| $(B)_z$, meq other cations per g zeolite | 3.83 | 3.56 | 3.25 | 2.82 | 2.51 |
| $[NH_4]_z$, equivalent fraction $NH_4$ in zeolite | 0.043 | 0.11 | 0.188 | 0.295 | 0.37 |
| $[NH_4]_s$, equivalent fraction $NH_4$ in solution | 0.046 | 0.137 | 0.21 | 0.26 | 0.28 |

Analysis, moles: $1.00\ Na_2O \cdot 1.0\ Al_2O_3 \cdot 3.55\ SiO_2 \cdot 7.0\ H_2O$
Calculated cation exchange capacity, meq/gram, 4.0

ILLUSTRATIVE EMBODIMENT

In an illustrative commercial embodiment of the invention, zeolite F is employed in the treatment of part of the secondary effluent from a municipal sewage treating facility. The effluent is preliminarily filtered to remove sediment, and then subjected to activated sludge treatment for aerobic decomposition of organic constituents. Following activated sludge treatment, suspended solids may be removed by introducing a coagulant such as an aluminum alum, which forms a heavy floc that occludes finely divided suspended material, and which is thereafter permitted to settle. After filtration, the stream is exposed to a bed of the zeolite F.

The secondary effluent fed to the zeolite contains the ammonium ion (14 mg/l, as nitrogen), sodium (58 mg/l), potassium (12 mg/l), magnesium (8 mg/l), and calcium (34 mg/l). Other contaminants include phosphate (9 mg/l as P) and sulfate (20 mg/l as S). The pH is approximately 7.3.

The secondary effluent, at a rate of 100,000 gallons per day, is then conducted to the cation exchange system. This includes two columns of clay-bonded zeolite F in the form of 1/16 inch pellets, and a third bed of the same material which is on a regeneration cycle. During the on-stream portion of the treatment cycle, the stream flows down through the two beds in series, while during regeneration the flow is upward.

Continuous monitoring of the stream leaving the first zeolite bed is employed to detect ammonium ion breakthrough. When this occurs, the first bed is taken out of operation and put on regeneration cycle, while a freshly regenerated bed is connected downstream of the new lead bed.

For regeneration, a saturated lime solution, additionally containing sodium chloride and calcium chloride (total 0.1 meq/l) is pumped up-flow for regeneration. The regenerant solution, having a pH of about 12, is fed to an air stripping tower provided with bubble trays or the like, where a countercurrent ascending air streams strips out the ammonia to a residual level of less than about 1 ppm in the regenerant solution.

After regeneration of a spent bed, the now-regenerated bed is permitted to drain so as to remove regenerant solution. Then, it is rinsed with a small amount of water to recover any regenerant remaining in the bed and to replace evaporated water. Before placing the bed on stream, it is inserted in series upflow between the two on-stream columns for a short period of time to remove residual alkalinity and small particulate matter; when this backwash is complete, it is connected in down-flow series when the lead column becomes spent.

Thus it is apparent that there has been provided, in accordance with the invention, an outstanding process for treating aqueous solutions containing ammonia, or the ammonium ion, together with one or more alkali or alkaline earth cations for removal of the ammonia or ammonium. In contrast to the use of related crystalline or non-crystalline zeolites, potassium-derived synthetic crystalline aluminosilicates having a silica-to-alumina oxide mol ratio of about 2 have unusually high capacity and selectivity for ammonia and/or the ammonium ion. Additionally, the rate of adsorption and desorption is consistent with high efficiency cation exchange systems.

While the invention has been described in conjunction with specific embodiments, many alternatives, modifications, and variations will be evident to those skilled in the art in light of the foregoing description. Accordingly, it is intended to embrace all such alternatives, modifications, and variations as fall within the spirit and broad scope of the appended claims.

I claim:

1. In the removal by zeolitic cation exchange of ammonium ions from an aqueous solution containing at least one alkali or alkaline earth cation, the improvement comprising: effecting said removal with a synthetic crystalline aluminosilicate having the structure of zeolite F and a silica to alumina oxide mol ratio of about 2.

* * * * *